Patented Oct. 17, 1950

2,526,545

UNITED STATES PATENT OFFICE 2,526,545

ETHERS OF 4,4'-(2-HYDROXY-ISOPROPYL-IDENE)DIPHENOL

Andrew J. Dietzler, Midland, Mich., assignor to The Dow Chemical Company, Midland, Mich., a corporation of Delaware No Drawing. Application May 28, 1948,
Serial No. 29,939

4 Claims. (Cl. 260—611)

The present invention is concerned with diphenols and is particularly directed to compounds having the following structural formula:

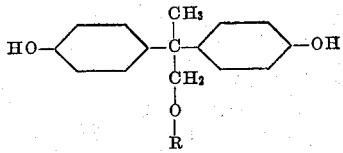

wherein the symbol R represents an alkyl or alkoxy-alkyl radical in which each alkyl structure contains from 1 to 5 carbon atoms, inclusive, or an aryl or chloroaryl radical of the benzene series. These compounds are colored resinous solids at 25° C., and adapted to be employed in the preparation of more complex organic derivatives, as constituents of fungicidal and bactericidal compositions, and as modifiers for plastic materials.

The new ether substituted isopropylidene diphenols may be prepared in accordance with the general method set forth in United States Patent No. 2,359,242. According to this procedure, a suitable ether-ketone e. g. 1-alkoxy-2-propanone, 1-aryloxy-2-propanone, etc., is reacted with a molecular excess of phenol in the presence of a sulfur-containing catalyst and an acid-acting condensing agent. Good results have been obtained in preparations employing 4 moles or more of phenol per mole of ether-ketone. Hydrogen sulfide is the preferred catalyst, and is employed in that amount absorbed by the reaction mixture when the gaseous hydrogen sulfide is bubbled below the surface of the phenol-ketone mixture. Other operable sulfur-containing compounds include sulfur monochloride, sulfur dichloride, sodium sulfide and the like.

Any strong mineral acid such as sulfuric acid, hydrochloric acid, and hydrogen chloride, or compounds hydrolyzed by water to form acids, such as aluminum chloride, sulphonyl chloride, etc., may be employed as the condensing agent. In practice from about 0.3 to 0.5 mole of anhydrous hydrogen chloride per mole of ether-ketone present in the mixture has been found to favor the production of the desired compounds in high yields. The hydrogen chloride is introduced below the surface of the reaction mixture with agitation and at such a rate as to be absorbed in the mixture.

The temperature at which the hydrogen sulfide and hydrogen chloride are added is not critical, but the reaction mixture is preferably maintained at 40° C. or lower. With the addition of the hydrogen chloride, considerable heat of reaction is developed, and it is generally necessary to cool and stir the reaction mixture both during the introduction of the condensing agent and for some time thereafter in order to prevent overheating. Best yields and superior products are obtained when the temperature of the mixture is maintained at below 40° C. and preferably at 10°–30° C. during the condensation. It is frequently desirable to allow the mixture to stand at room temperature for from 12 hours to several days following addition of the condensing agent and before separation of the diphenol compound. This insures a maximum yield of the latter based on the ether-ketone employed.

The separation of the diphenol is accomplished in conventional fashion by washing the crude reaction product with water and partially fractionally distilling under reduced pressure to strip off water, uncondensed ether-ketone, and excess phenol. The residue from the distillation may be blown with steam to remove the remainder of the phenol and dried to obtain the desired diphenol compound.

The following examples illustrate the invention but are not to be construed as limiting.

Example 1

67.7 grams (0.72 mole) of phenol was dissolved in a mixture of 18.4 grams (0.18 mole) of 1-ethoxy-2-propanone (boiling at 128° C. at 760 millimeters pressure). The solution was cooled to 6° C. with stirring, and 3 grams of gaseous hydrogen sulfide bubbled below the surface of the reaction mixture in 10 minutes. 6.4 grams of anhydrous hydrogen chloride was then passed into the agitated mixture over a period of 20 minutes, the temperature being permitted to rise slowly from 6° to 21° C. during the addition. The temperature of the mixture was maintained at between 21° and 36° C. and stirring continued for an additional 2 hours. The reaction mixture was then allowed to stand at room temperature for 48 hours. The resultant crude reaction product was washed five times at 25° C. with 100 milliliter portions of water, and subjected to a partial fractional distillation by heating to a pot temperature of 175° C. at 25 millimeters pressure to recover water and unreacted phenol. The 50 gram residue from the distillation was blown with 50 grams of steam at 150° C. and 25 millimeters pressure, and dried. 46.7 grams of a 4,4'-(2-ethoxy-isopropylidene) diphenol product was thereby obtained as a viscous brown liquid at 150° C. At room temperature this compound is a brittle resin having a density of 1.209 at 25° C. It is completely soluble in dilute aqueous alkali.

*Example 2*

In a similar manner, 72.5 grams (0.77 mole) of phenol and 20.4 grams (0.154 mole) of 1-(2-methoxy-ethoxy)-2-propanone (boiling at 188° C. at 752 millimeters pressure) were reacted together to obtain 4,4'-[2-(2-methoxy-ethoxy)-isopropylidene] diphenol. In this preparation, 0.8 gram of gaseous hydrogen sulfide was added to the mixture of phenol and ketone in 3 minutes, and 7.5 grams of anhydrous hydrogen chloride in 15 minutes, the mixture being agitated and cooled to 10°–15° C. during both additions. Upon introduction of the hydrogen chloride, appreciable heat of reaction developed, necessitating further cooling and stirring for a period of 1.5 hours, during which time the temperature was maintained between 10° and 30° C. The red-brown viscous reaction mixture, after standing for an additional 24 hours at room temperature, was washed three times at 25° C. with 100 milliliter portions of water, partially fractionated by gradually heating to a maximum pot temperature of 140° C. at 25 millimeters, blown with 43 grams of steam at 100° to 120° C. at 10 millimeters pressure, and dried. The resulting 37.4 grams of 4,4'-[-2-(2-methoxy-ethoxy)-isopropylidene] diphenol product was a red-brown brittle resin at room temperature, and had a density of 1.200 at 25° C. The product is completely soluble in dilute aqueous alkali.

*Example 3*

30.1 grams (0.2 mole) of 1-phenoxy-2-propanone (boiling at 229° C. at 760 millimeters pressure) and 94.1 grams (1.0 mole) of phenol were mixed together and treated with 1.6 grams of gaseous hydrogen sulfide and 6.4 grams of anhydrous hydrogen chloride substantially as described in Example 1. The hydrogen sulfide was bubbled into the mixture in 2 minutes at 20° C. and the hydrogen chloride in 11 minutes at 20°–23° C. During the hydrogen chloride addition and for 3 hours thereafter, heat of reaction was developed and the mixture was vigorously agitated and cooled to maintain the temperature at below 40° C. The reaction mixture was allowed to stand for an additional 96 hours at 20°–25° C. The resulting crude product was a red viscous oil. This product was washed four times with 100 milliliter portions of water, partially fractionated to recover constituents boiling at up to 120° C. pot temperature at 12 millimeters pressure, blown with 100 grams of steam at 130° C. and under 17 millimeters pressure, and dried. 54.4 grams of a 4,4'-(2-phenoxy-isopropylidene) diphenol product was thereby obtained as a viscous red liquid at 100° C. and a brittle resin at room temperature. The compound is completely soluble in dilute aqueous alkali, and has a density of 1.214 at 25° C.

*Example 4*

18.5 grams (0.1 mole) of 1-orthochlorophenoxy-2-propanone, (boiling at 120° C. at 6 millimeters pressure) 47 grams (0.5 mole) of phenol, 1.1 grams of gaseous hydrogen sulfide, and 8.6 grams of anhydrous hydrogen chloride were reacted together in the manner described in the preceding example. The hydrogen sulfide was added to the mixture of phenol and ketone in 2 minutes at 20° C. with agitation, and the hydrogen chloride in 10 minutes with agitation and cooling to 20°–23° C. After 5 days standing at room temperature, the viscous red reaction liquid was washed at 50° C. with three 75 milliliter portions of water, and partially fractionally distilled to recover by-products and unreacted phenol boiling at up to 150° C. (pot temperature) at 10 millimeters pressure. The residue was blown with 100 grams of steam at 120°–130° C. and 17 millimeters pressure, and dried to obtain 30 grams of a 4,4'-(2-orthochlorophenoxy-isopropylidene) diphenol product as a red-brown resinous solid at room temperature. This compound had a density of 1.235 at 25° C., and was completely soluble in dilute aqueous alkali.

By substituting for the ether-ketones shown in the examples 1-methoxy-2-propanone, 1-propoxy-2-propanone, 1 - secondary-butoxy-2-propanone, 1-normal pentoxy-2-propanone, 1-(2-ethoxy-ethoxy)-2-propanone, 1-(3-propoxy-propoxy)-2-propanone, 1-orthocresoxy-2-propanone, 1-orthoxenoxy-2-propanone, 1 - parabenzyl-phenoxy-2-propanone, 1-(2,4,6-trichlorophenoxy)-2 - propanone, 1 - (4-tertiarybutylphenoxy)-2-propanone, and the like, the corresponding diphenol compounds are obtained. The ether-ketones so employed, are conveniently produced by reacting the corresponding alcohol, ether-alcohol or phenol with propylene oxide to produce an ether-propanol and subjecting the latter to catalytic oxidation. In the case of the 1-aryloxy-2-propanones, an alternative method consists of reacting chloroacetone with the sodium salt of the monohydric phenol.

I claim:

1. A diphenol compound of the formula

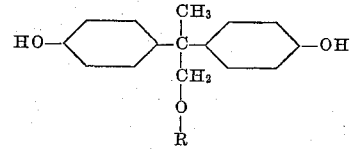

wherein R is a member of the group consisting of alkyl, and alkoxy-alkyl radicals containing from 1 to 5 carbon atoms, inclusive, and aryl and chloroaryl radicals of the benzene series.

2. 4,4'-(2-ethoxy-isopropylidene) diphenol.

3. 4,4'-(2-phenoxy-isopropylidene) diphenol.

4. 4,4' - (2 - orthochlorophenoxy - isopropylidene) diphenol.

ANDREW J. DIETZLER.

No references cited.